United States Patent [19]

Suzuki

[11] Patent Number: 4,657,362
[45] Date of Patent: Apr. 14, 1987

[54] DOOR MIRROR

[75] Inventor: Masaru Suzuki, Chiryu, Japan

[73] Assignee: Kabushiki Kaisha Tokai Riki Denki Seisakusho, Aichi, Japan

[21] Appl. No.: 705,099

[22] Filed: Feb. 25, 1985

[30] Foreign Application Priority Data

Feb. 27, 1984 [JP] Japan .................................. 59-36964
Jul. 24, 1984 [JP] Japan ................................. 59-158435

[51] Int. Cl.⁴ .......................... B60R 1/06; G02B 5/08; G02B 7/18
[52] U.S. Cl. .................................... 350/637; 248/479; 248/487; 350/632; 350/636
[58] Field of Search ............................... 350/631-634, 350/636, 637; 74/501 M; 248/474, 476, 479, 485-487

[56] References Cited

U.S. PATENT DOCUMENTS

| | | | |
|---|---|---|---|
| 3,459,470 | 8/1969 | Hahn | 350/636 |
| 3,575,496 | 4/1971 | Pollock et al. | 350/637 |
| 4,050,776 | 9/1977 | Hsu | 350/636 |
| 4,286,841 | 9/1981 | Deshaw | 248/487 X |
| 4,403,829 | 9/1983 | Thujiuchi et al. | 350/637 |

Primary Examiner—John Petrakes
Attorney, Agent, or Firm—Jackson & Jones

[57] ABSTRACT

The disclosure relates to a door mirror for use in a motor vehicle having a door mirror positioning device for controlling the attitude of the mirror visor with respect to the door from the interior of the motor vehicle through remote control. The device includes a first switching arrangement for selectively driving an electrical motor accommodated in the visor in a desired rotational direction to move the visor to an opened (projected) or closed (retracted) position from the closed or opened position, and a second switching arrangement for stopping automatically the rotation of the motor at a time when the visor reaches one of the opened and closed positions, whereby the operation of the device can be facilitated.

8 Claims, 8 Drawing Figures

DOOR MIRROR

BACKGROUND OF THE INVENTION

The present invention generally relates to a door mirror of a motor vehicle and, more particularly, to a tiltable door mirror having a door mirror positioning device for controlling the attitude of a tiltable mirror visor with respect to the door from the interior of the motor vehicle through remote control.

Since the door mirror is mounted on the outer surface of the door so as to extend laterally of said door, when the motor vehicle enters a narrow garage, the laterally extending door mirror may be damaged as a result of a collision with some part of the structure. Therefore, conventionally, such a door mirror is provided with a stay secured on the outer surface of the door which pivotally supports said mirror visor thereon. An electrical motor is fixedly accommodated or carried in the visor and a power transmission means transmits power of the motor to the stay to pivotally move the visor to an opened (or projected position) from a closed (or retracted) position and vice versa with respect to the stay. A control means is provided for selectively driving the motor in a desired rotational direction and includes a remote control switch mounted on a suitable member in the vehicle, for example, an instrument panel. A driver in the vehicle can see a reflected image from a reflection mirror supported on the visor in the opened or normal position. In the closed position the attitude of the visor is such that the reflection mirror faces the outer surface of the door.

In the conventional tiltable door mirror, it is necessary to manually operate of the actuating knob of the remote control switch during the entire pivotal movement of the visor from one position to the other. Furthermore, in the case where the remote control switch is of a self-holding type, the driver sometimes carelessly leaves the actuating knob in operational state even after the visor has reached the desired position.

SUMMARY OF THE INVENTION

Accordingly, an essential object of the present invention is to provide an improved door mirror which can overcome such disadvantages as described above.

In accomplishing this and other objects, according to one preferred embodiment of the present invention, there is provided an improved door mirror for use in a motor vehicle which comprises a stay secured on an outer surface of a door and pivotally supporting a mirror visor thereon. An electrical motor is mounted the visor. A power transmission means transmits power from the motor to the stay to pivotally move the visor to an opened (projected) or closed (retracted) position and vice versa with respect to the stay. Control means are provided for selectively energizing the motor to cause it to rotate in a desired rotational direction. The visor is so designed to rotate around a shaft portion provided on the stay.

The power transmission means comprises a first gear connected to the motor and second gear secured on the shaft portion of the stay and arranged to engage with the first gear. The control means comprises a control circuit which has a manually operable switch and is arranged to drive the motor in a desired direction when an actuating knob thereof is manually operated in corresponding direction so that the visor alternatively moves to the closed or opened position from the opened or closed position. Stop means are provided to stop the energization of the motor when the visor has reached one of said closed and opened positions.

With the tiltable door mirror as described above, it is possible to remotely control the attitude of the visor, namely the opened position or closed position of the visor, from the interior of the vehicle, without a troublesome operation of opening the windows, by operating switch included in the control means. Furthermore, the motor is ensured to automatically stop when the visor has reached one of the closed and opened positions.

Furthermore, according to a second embodiment of the present invention, the control means comprises: (1) a switching circuit for reversing the polarity connection of said power source to the motor, (2) a manually operable switch for selecting the polarity connection of the switching circuit so as to move the visor to closed or opened position from the opened or closed position, and (3) a rotary switch responsive to the pivotal movement of the visor, and, arranged to be turned on when the visor takes one of the closed and opened positions, and to be turned off during a time when the visor passes an intermediate portion between the closed and opened positions, whereby the operator of said switching circuit stops.

Still further, according to a third embodiment, said control means comprises an manually operable switching means for reversing the polarity connection of the power source to the motor so as to move the visor to one of closed and opened positions from the other position, a rotary switch designed as to be operably associated with the pivotal movement of said visor and also as to be turned off when said visor has reached one of the closed and opened position so that the pivotal movement of the visor stops.

BRIEF DESCRIPTION OF THE DRAWINGS

These and other objects and feature of the present invention will become apparent from the following description taken in conjunction with the preferred embodiment thereof with reference to the accompanying drawings, in which.

DETAILED DESCRIPTION OF THE INVENTION

Figure 1:
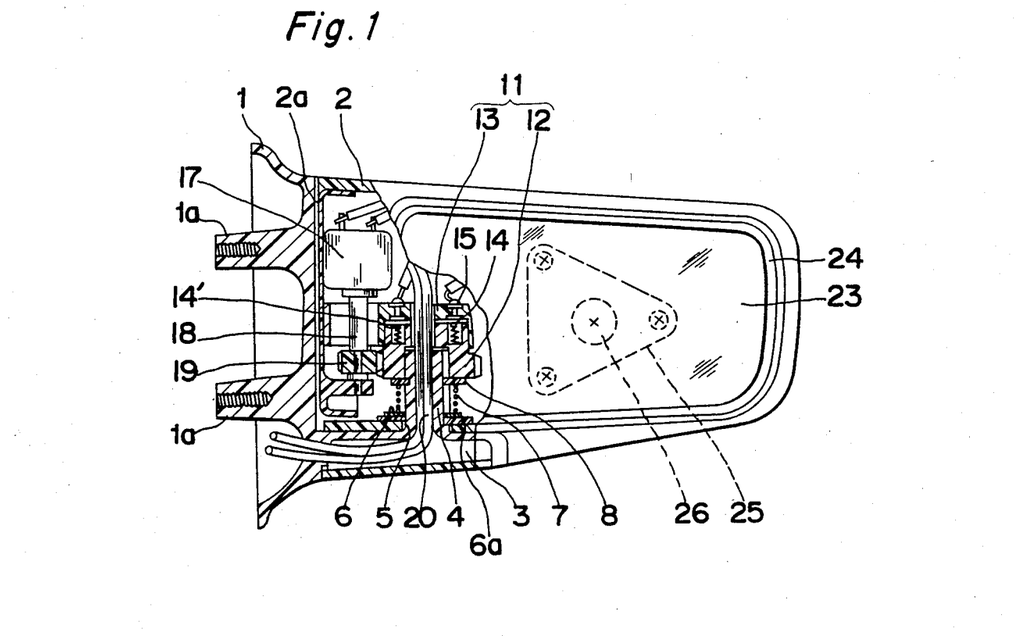
FIG. 1 is a partially fragmental front elevational view of a door mirror according to one preferred embodiment of the present invention.

Referring now to the drawings, there is shown in FIG. 1, a tiltable door mirror according to one preferred embodiment of the present invention, which is to be mounted on a right-hand door of a motor vehicle.

The door mirror comprises a stay 1 secured on an outer surface of the door (not shown) and pivotally supporting a mirror visor 2 thereon. An electrical motor 17 is mounted on the visor 2. Power transmission means including members 18, 19 and 12 (to be described later) transmit power from the motor 17 to the stay 1 to pivotally move the visor 2 to an opened (projected) or a closed (retracted) position and vice versa with respect to the stay 1. A control means selectively energizes the motor 17 to cause it to rotate in a desired direction.

The stay 1 has a pair of leg portions 1a to be secured on the door by means of screws or other suitable members, and an arm portion 3 which extends horizontally outwardly from a body thereof and pivotally support a left end portion of the visor 2 from below. The stay 1 includes a shaft portion 4 which extends upwardly from the arm portion 3.

The visor 2 has a reflection mirror 23 mounted therein in a known manner. Namely, the reflection mirror 23 is supported by a back plate 24 which is tiltably connected to a supporting member 25, secured to the visor 2, by means of a ball-joint structure 26. The visor 2 also has an aperture 5, at its left end bottom wall portion, through which the shaft portion 4 of the stay 1 passes from below. Thus, the visor 2 can rotate around the shaft portion 4 between the opened and closed positions. FIG. 1 illustrates the visor 2 in the opened or projected position.

The power transmission means comprises a first gear 19 mounted on an output shaft 18 of the motor 17, and second gear 12 secured on the shaft portion 4 of the stay 1 for engaging the first gear 19.

The control means for selectively energizing the motor includes a rotary switch 11 which comprises the second gear 12 having first and second stationary terminals 14 and 14' thereon, and a rotary member 13. The rotary member 13 carries a contact member 15 and is mounted on a covering plate 2a of the visor a to rotate therewith around the axis of said shaft portion 4 of said stay 1 as illustrated. The rotary switch 11 is so arranged that; (1) when the visor 2 takes the opened position as shown in FIG. 1, the movable contact member 15 contacts only the first terminal 14, (2) when the visor 2 takes the closed position (not shown), the movable contact member 15 contacts only the second terminal 14', and (3), during the time when the visor 2 moves between the opened and closed positions, the movable contact member 15 is held out of contact with either of the first and second terminals 14 and 14'.

In addition, a helical spring 7 is mounted around the shaft portion 4 of the stay 1 between the bottom wall of the visor 2 and the second gear 12. The upper and lower ends of the spring 7 are received by upper and lower retainers 8 and 6. The lower spring retainer 6 is always urged by the spring 7 so as to contact under pressure a disk-like detent member 6a secured to the bottom wall of the visor 2. Lead wires 20 connected to the motor 17 and the rotary switch 11 are led, through central passages of the rotary member 13, second gear 12 and the shaft portion 4, out of the mirror assembly to remote control switch or an operation switch included in the control means and mounted on an instrument panel in the vehicle.

Figure 2:
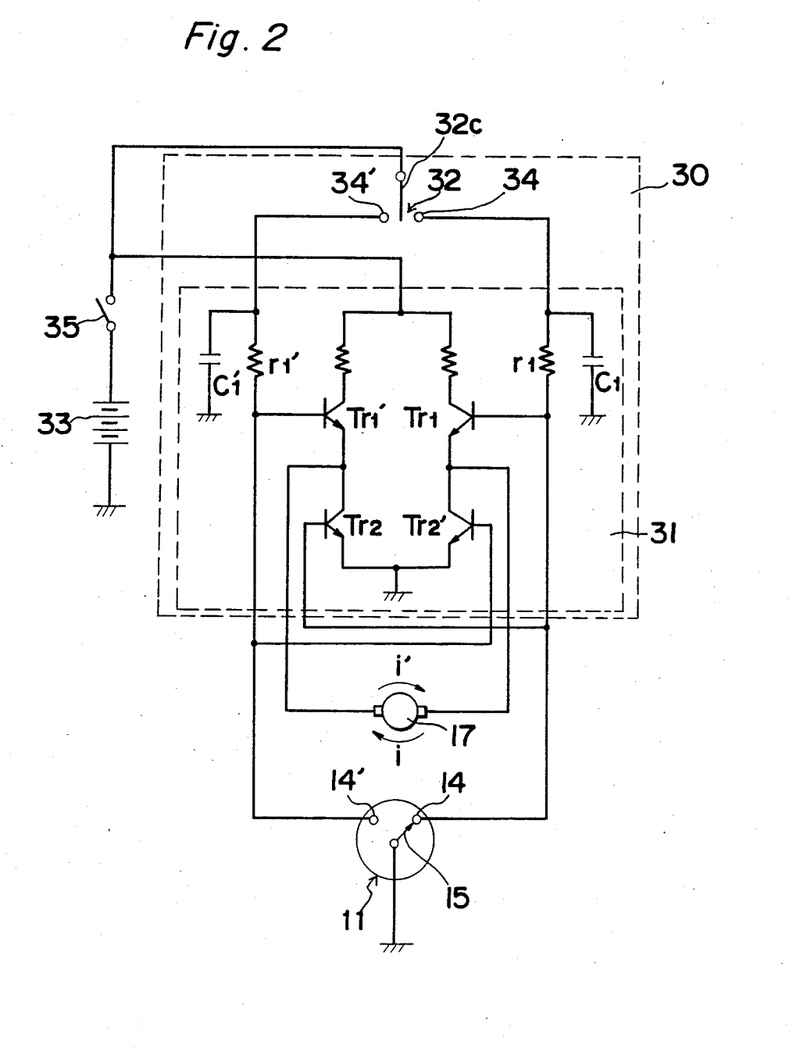
FIG. 2 is a circuit diagram of a door mirror positioning device for the door mirror shown in FIG. 1.

Referring now to FIG. 2, there is shown a circuit for controlling the door mirror illustrated in FIG. 1, including said control means, which comprises a control circuit 30 which has a manually operable switch or operation switch 32, and is designed to energize the motor 17 to cause it to rotate in a desired direction when an actuating knob 32R and 32L thereof (shown in FIGS. 4a and 4b) is manually operated in corresponding direction. In response to the actuation of the knob 32R or 32L of the corresponding mirror (left or right) the visor 2 alternatively moves to the closed or opened position from the opened or closed position. A stop means, i.e. the rotary switch 11 is designed or arranged to stop the driving of the motor 17 (by terminating the energization thereof) when said visor 2 has reached one of the closed and opened positions.

The control circuit 30 includes a switching circuit 31 for reversing the polarity connection of a direct current (DC) power source 33 to the motor 17, and the operation switch 32, as described above, for selecting a polarity reversing direction of the switching circuit 31 for operation thereof so as to move said visor 2 to the closed or opened position from the opened or closed position.

The operation switch 32 comprises a movable contact member 32c connected to said power source 33 through an ignition switch 35, and first and second terminals 34 and 34' in association with the movable contact member 32c. As previously described, the operation switch 32 is mounted on an instrument panel in the vehicle, and is of a momentary switch type which has an actuating knob which may be turned on during only the operation thereof, on one hand, and return to the original position to be turned off upon being released, in the other hand.

The switching circuit 31 comprises a bridge circuit which has four transistors Tr1, Tr2', Tr2 and Tr1' and is connected to the power source 33 through the ignition switch 35, a first capacitor C1 interposed between the first terminal 34 and ground, and a second capacitor C1' interposed between the second terminal 34' and ground. The motor 17 is interposed between a connecting point of the first and second transistors Tr1 and Tr2' and a connecting point of the third and fourth transistors Tr2 and Tr1'. The first terminal 34 is connected to each base of the first and third transistors Tr1 and Tr2 in parallel relationship to the first capacitor C1, while the second terminal 34' is connected to each base of the second and fourth transistor Tr2' and Tr1' in a parallel relationship to the second capacitor C1'.

The rotary switch 11 comprises first and second terminals 14 and 14' respectively connected to the first and second terminals 34 and 34' of said operation switch 32, and the movable contact member 15 connected to ground. The operation of the above circuit is described therebelow.

FIG. 2 indicates a state, with respect to the rotary switch 11 in which, the movable contact member 15 is connected to the first terminal 14, and accordingly, the visor 2 is moved to the opened position. On the assumption that the ignition switch 35 is turned on and also the movable contact member 32c of the operation switch 32 is operated so as to become in contact with the second terminal 34', the second capacitor C1' is charged, and the forth and second transistors Tr1' and Tr2' are simultaneously turned on. The motor 17 is thus driven in one direction by means of the driving current i' so that the visor 2 begins moving to the closed position from the opened position causing the movable contact member 15 of the rotary switch 11 to depart from the first terminal 14. It is to be noted that the movable contact member 32c of the operation switch 32 can be released at this time. Even if the member 32c is released so that the operation switch 32 is turned off, the forth and second transistors Tr1' and Tr2' are held ON by means of the charge on the second capacitor C1', and the motor 17 is driven until the visor 2 reaches the closed position. In this position, the movable contact member 15 contacts the second terminal 14' so that the second capacitor C1' is discharged through a resistor r1' and the transistors Tr1' and Tr2' are turned off de-energizing the motor and causing the driving of the motor 17 to stop.

Subsequently, when the movable contact member 32c of the operation switch 32 is operated so as to contact the first terminal 34, the rotary switch 11 effects an operation opposite to the above. In other words, the first and third transistors Tr1 and Tr2 are turned on driving the motor 17 in the other direction by means of the current i so that the visor 2 moves to the opened position.

Figure 3:
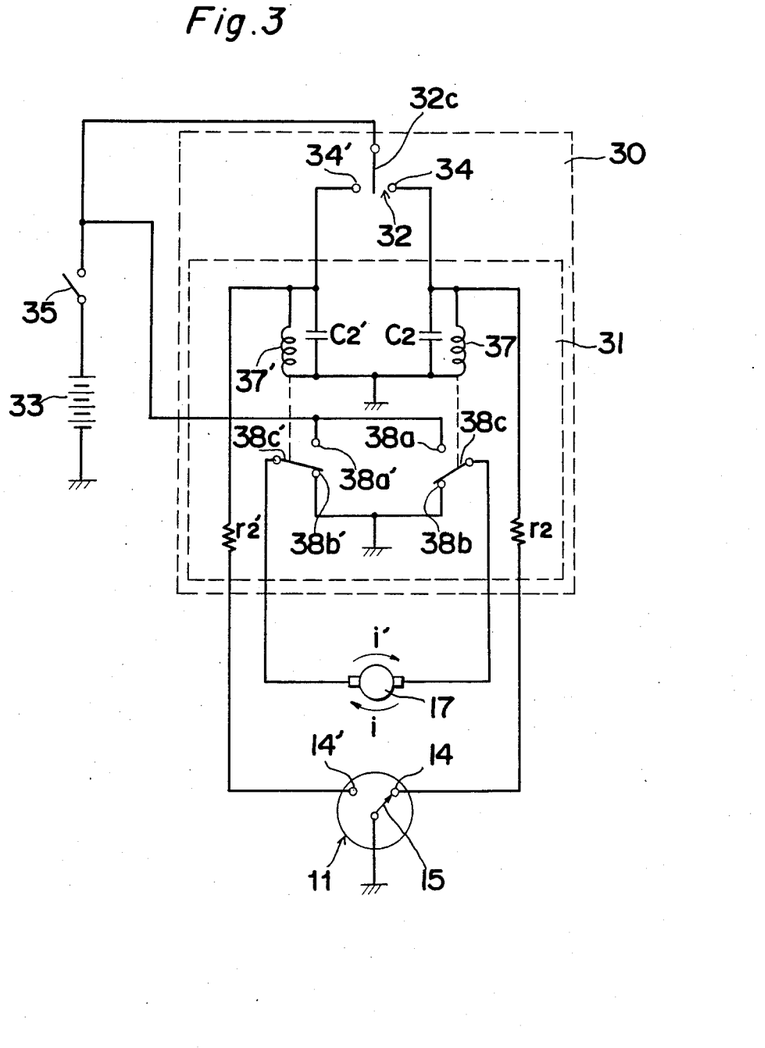
FIG. 3 is a circuit diagram similar to FIG. 2, showing a modification of the circuit diagram of FIG. 2.

Referring to FIG. 3, there is shown a modification of the above embodiment, in which the switching circuit 31 includes relays instead of the transistors. Namely, the switching circuit 31 comprises first and second relays and first and second capacitors C2 and C2'. The relays have first and second relay coils 37 and 37', respectively, connected to the power source 33 through the first and second terminals 34 and 34'; the moveable contact member 32c and the ignition switch 35. First and second movable contact members 38c and 38c' of the relays respectively, connect said motor 17 via, first and second normally open contact terminals 38a and 38a' as shown and ignition switch 35 to said power source 33. The first and second normally closed terminals 38b and 38b' respectively of the relays are connected to ground. The first and second capacitors C2 and C2' are respectively connected to the power source in parallel with the first and second relay coils 37 and 37'.

The first and second terminals 14 and 14' of the rotary switch 11 are, respectively, connected to the first and second terminals 34 and 34' of the operative switch 32 through resistors r2 and r2'.

With the above modification, on the assumption that the movable contact member 32c shown in FIG. 3 is now operated so as to contact the second terminal 34', the second capacitor C2' is charged, and simultaneously the second relay coil 37' is energized to turn the movable contact member 38c' to the normally opened terminal 38a' from the normally closed terminal 38b', to allow current i' to flow through the motor 17. This causes the motor 17 to be driven in one direction so that the visor 2 rotates to the closed position from the opened position. Since the energized condition of the second relay coil 37' is held due to the charge on the second capacitor C2', even if the movable contact member 32c is released so as to return to the neutral position shown in FIG. 3, the motor 17 can be successively driven. When the visor 2 reaches the closed position, the movable contact member 15 of the rotary switch 11 comes into contact with the second terminal 14' causing the second capacitor C2'to discharge through the resister r2' and the rotary switch 11 to ground. Thus, the second relay coil 37' is de-energized to stop the driving of the motor 17. Subsequently, when the movable contact member 32c is operated so as to contact the first terminal 34, the first relay coil 37 is energized to turn the movable contact member 38c to the normally opened terminal 38a from the normally closed terminal 38b causing current i to flow through the motor 17. In this condition the motor 17 is driven in such a direction that the visor 2 rotates to the opened position from the closed position.

Figures 4A, 4B:
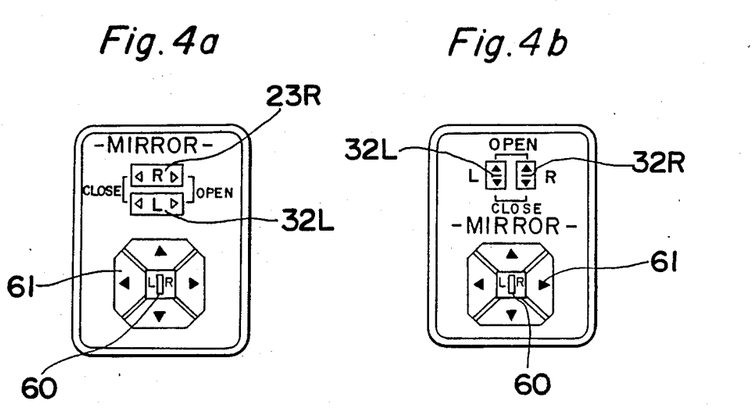
FIGS. 4a and 4b are front elevational views of remote control switch respectively adapted to the embodiment shown in FIGS. 2 and 3.

Referring to FIGS. 4a and 4b, there is shown different remote control switch assemblies which are respectively to be mounted on an instrument panel, as previously described, and include the control circuit 30 as described above as well as an angle adjusting circuit for adjusting the angle of the reflection mirror 23. It is to be noted that, although FIGS. 1, 2 and 3 indicate only right-hand door mirror and circuits for controlling the right-hand door mirror, a motor vehicle generally has a pair of right-hand and left-hand door mirrors. Accordingly, each of said remote control switch assemblies includes two sets of a pair of control circuits and angle adjusting circuit respectively for the right-hand and left-hand door mirrors. Operation knobs for the operation switches 32 of right-hand and left-hand door mirrors are represented by the reference symbols 32R and 32L, while an operation knob for selecting one of right and left-hand reflection mirror to be adjusted is represented by a reference numeral 60. One of operation or actuating knobs for the angle adjusting switch circuit is represented by the numeral 61. In addition, a mechanical construction and the angle adjusting circuit for adjusting the angle of the reflection mirrors are not shown in the drawings.

Figures 5, 6:
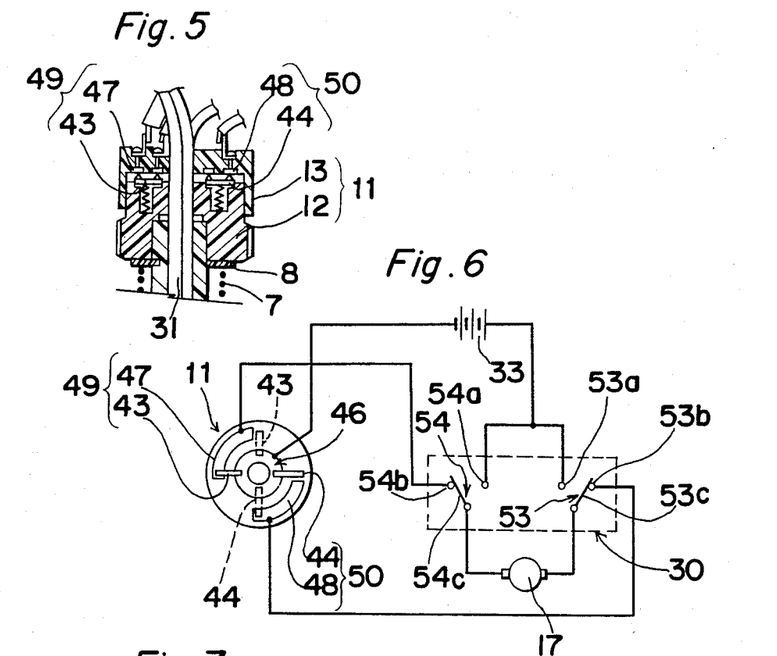
FIG. 5 is a partial sectional view showing a rotary switch of a door mirror according to another embodiment of the present invention.
FIG. 6 is a circuit diagram of the door mirror positioning device for the door mirror shown in FIG. 5.

Referring to FIG. 6, there is shown a circuit according to another embodiment of the present invention which includes a control means 30 for reversing the polarity connection of the motor 17 with respect to a power source 33 so as to move the visor 2 to one of closed and opened positions from the other position. A rotary switch 11 is designed to operate with the pivotal movement of the visor 2 and also to be turned to the off state when the visor 2 has reached one of the closed and opened position so that the pivotal movement of the visor 2 stops.

The rotary switch 11 comprises the second gear 12 and a rotary member 13. The rotary member 13 has, at a lower end face thereof, a movable contact member 46 connected to a power source 33, and a pair of contact segments 47 and 48, which are designed to move together with the visor 2. While the second gear 12 has, at an upper end face thereof, a pair of contact arms 43 and 44, in association with said movable contact member 46 and a pair of contact segments 47 and 48.

One contact arm 43, one segment 47 and the movable contact member 46 constitute a first rotary switch, and the other contact arm 44, the other segment 48 and the movable contact member 46 constitute a second rotary switch.

The control circuit 30 comprises first and second operation switches 54 and 53 in association with each other which respectively have movable contact members 54c and 53c connected to the motor 17 and designed to be manually operated, normally opened terminals 54a and 53a respectively connected to the power source 33, and normally closed terminal 54b and 53b. The normally closed terminal 54b of the first operation switch 54 is connected to the segment 47 of the rotary switch 11, while the other normally closed terminal 53b of the second operation switch is connected to the segment 48 of said rotary switch 11. The movable contact members 54c and 53c are designed to be alternatively held in contact with the corresponding normally opened terminals 54a and 53a. The operation of the door mirror positioning device or control means according to the second embodiment is described hereinafter.

It is to be noted that FIG. 6 shows a condition in which one contact arm 43 of the rotary switch 11 is in contact with the movable contact member 46 and one end portion of one segment 43, while the other contact arm 44 is in contact with the movable contact member 46, but is in not in contact with the other segment 48. The movable contact members 54c and 53c of the first and second switches 54 and 53 of the control circuit 30 are respectively in contact with the corresponding normally closed terminals 54b and 53b. Accordingly the visor 2 is moved to the opened position. On the assumption that the second switch 53 is now operated so that the movable contact member 53c is turned to the normally opened terminal 53a from the normally closed terminal 53b, the movable contact member 53c is held in the position even if the operator releases the actuating knob (not shown) of the second switch 53. In this switch position, the motor 17 is driven so that the visor 2 moves to the closed position from the opened position. When the visor 2 has reached the closed position, the contact arm 43 of the rotary switch 11 departs from the first segment 47 to turn off the first rotary switch 49 causing the motor 17 to stop, while the contact arm 44 of the second rotary switch 50 is held in contact with the second segment 48, the relative relationship of the contact arms 43 and 44 and the segments 47 and 48 being indicated by the dotted line in FIG. 6.

In contrast contrary to the above, when the first operation switch 54 is subsequently operated so that the movable contact member 54c is turned to the normally opened terminal 54a from the normally closed terminal 54b, the movable contact member 53c of the second switch 53 automatically returns to the normally closed terminal 53b from the normally opened terminal 53a, and simultaneously the motor 17 is driven in the other direction opposite to the above so that the visor 2 in the closed position moves to the opened position. When the visor 2 has reached the opened position, the contact arm 44 of the rotary switch 11 takes the position shown in the solid line in FIG. 6, thus, the driving of the motor 17 stops.

Figure 7:
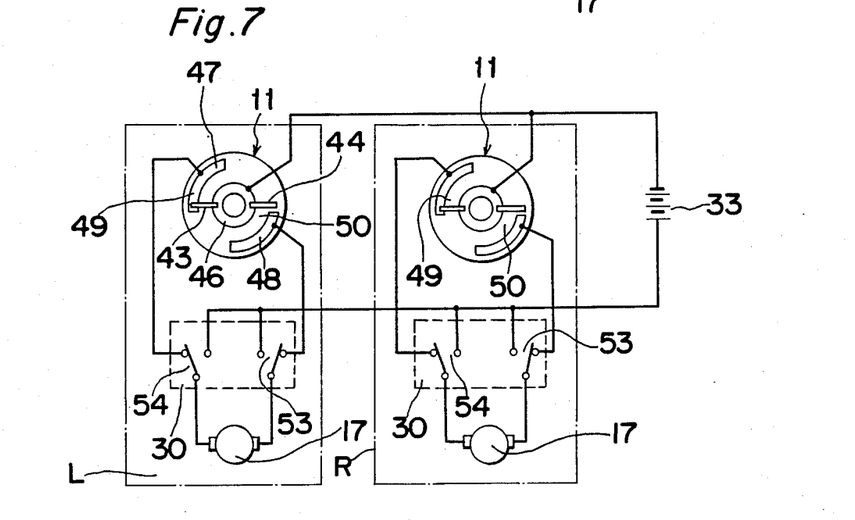
FIG. 7 is a circuit diagram showing a modification of the circuit diagram shown in FIG. 6.

Referring to FIG. 7, there is shown a circuit for controlling both of right and left-hand door mirrors which includes a pair of circuits R and L connected in parallel to the power source 33. Both of the circuits R and L are the same as the circuit shown in FIG. 6. The control switch for the circuit shown in FIG. 7 may be constructed, for example, in the same way as shown in FIGS. 4a and 4b.

Although the present invention has been fully described by way of example with reference to the accompanying drawings, it is to be noted here other various changes and modifications will be apparent to those skilled in the art without departing from the spirit and scope of the invention. For example, for the purpose of absorbing an accidental force to the visor, a clutch means may be employed in the transmission means. According to a preferred modification, the clutch means comprises the first and second gears 19 and 12, one of which is constructed of relatively soft material such as rubber or polyurethane, while the other one is contructed of relatively hard material such as polyacetal. With the above modification, when a strong force is accidentally applied to the visor, the teeth of the soft gear can be readily deformed with respect to the teeth of the hard gear so that the first gear 19 can move together with the visor and motor around the second gear 12. Furthermore, the transmission means may includes a plurality of reduction gears between the first and second gears 19 and 12 for the purpose of increasing the driving force for tilting the visor. In addition, the transmission means may include, as reduction members, a worm gear and worm wheel. Still further, the rotary switch 11 may comprise a combination of limit switches and a cam mechanism. For example, the rotary switch according this modification may comprise a pair of limit switches secured on the rotary member 13, and a cam member which is mounted around the shaft portion 4 so as to rotate together with the visor while moving upwardly and downwardly to operate the limit switches. Such changes and modifications should be construed as being included in the invention.

What is claimed is:

1. In a door mirror for use in a motor vehicle, the combination which comprises:
    a stay having a shaft portion and secured on an outer surface of a door of a vehicle,
    a mirror visor pivotally supported on the stay so that the visor may rotate about the shaft portion on the stay between a projected and a retracted position,
    an electrical motor mounted on the visor;
    power transmission means for transmitting the power developed by the motor to the stay to pivotally move the visor between the projected and retracted position with respect to the stay, the power transmission means including a first gear connected with the motor and a second gear secured on the shaft portion of the stay and arranged to engage the first gear, whereby the motor when driven turns the first gear together with the visor around said second gear and, hence, around the shaft portion of the stay so that the visor moves between the retracted and projected positions;
    a control circuit for selectively driving the motor in a desired rotational direction, the control circuit including a manually operable switch and an actuating knob for the switch, the manually operable switch being arranged to drive the motor in a desired direction when the actuating knob is operated in a corresponding direction so that the visor is moved from the retracted position to the projected position or from the projected position to the retracted position, and
    a rotary switch mounted on the shaft portion of the stay and coupled to the control circuit, the rotary switch being responsive to the movement of the visor to stop the motor when the visor has reached one of the retracted and projected positions.

2. In a door mirror for use in a motor vehicle, the combination which comprises:
    a stay having a shaft portion and secured on an outer surface of a door of the vehicle,
    a mirror visor pivotally supported on the stay so that the visor may rotate about the shaft portion of the stay between a projected and a retracted position,
    a source of DC power for the motor;
    power transmission means for transmitting the power developed by the motor to the stay to pivotally move the visor between the projected and retracted position with respect to the stay, the power transmission means including a first gear connected with the motor and a second gear secured on the shaft portion of the stay and arranged to engage the first gear, whereby the motor when driven turns the first gear together with the visor around said second gear and, hence, around the shaft portion of the stay so that the visor moves between the retracted and projected positions;

a switching circuit for connecting the motor to the power source and for selectively reversing the polarity of power applied to the motor to selectively drive the motor in a desired direction;

a manually operable switch for operating the switching circuit to move said visor from the retracted position to the projected position or from the projected position to the retracted position; and a rotary switch mounted on the shaft portion of the stay and coupled to the switching circuit, the rotary switch being arranged to sense the pivotal movement of visor, and to be turned to one state when the visor is in one of the retracted and projected positions, and to be turned to another state during the time that the visor passes an intermediate position between the retracted and projected positions, whereby the operation of said switching circuit and the motor stops when the rotary switch is turned to said one state.

3. A door mirror as claimed in claim 2, wherein:

said manually operable switch comprises a contact member connected to said power source, and first and second terminals in association with said contact member, said switching circuit comprises a bridge circuit having four transistors connected to said power source, a first capacitor interposed between said first terminal and ground, and a second capacitor interposed between said second terminal and ground, said motor being interposed between a connecting point of said first and second transistor and a connecting point of said third and fourth transistors, said first terminal being connected to each base of said first and third transistors in parallel relationship to said first capacitor, said second terminal being connected to each base of said second and fourth transistors in parallel relationship to said second capacitor, and said rotary switch comprises first and second terminals respectively connected to said first and second terminals of said manually operable switch, and a contact member arranged to contact one of the first and second terminals of the rotary switch when said visor is in said projected and retracted positions and to not contact the first and second terminals of the rotary switch when said visor is in between said positions.

4. A door mirror as claimed in claim 3, wherein said rotary switch further includes said second gear having said first and second terminals mounted thereon, and a rotary member having said contact member mounted thereon, the rotary member being secured to said visor so as to rotate therewith around an axis of said shaft portion of said stay.

5. A door mirror as claimed in claim 2, wherein:

said manually operable switch comprises a movable contact member connected to said power source, and first and second terminals associated with said contact member, said switching circuit comprises first and second relays and first and second capacitors, said first and second relays respectively having first and second relay coils and respectively connected to said power source through said first and second terminals, first and second movable contact members respectively connected to said motor, first and second normally opened terminals respectively connected to said power source, first and second normally closed terminals respectively connected to ground, said first and second capacitors being respectively connected to the power source in parallel to said first and second relay coils, said rotary switch comprises first and second terminals respectively connected to said first and second terminals of said manually operable switch, and a contact member arranged to contact the first or second terminal when said visor is moved to said projected or retracted position and not to contact the first or second terminal when said visor is intermediate said positions.

6. A door mirror as claimed in claim 5, wherein said rotary switch further includes said second gear having said first and second terminals mounted thereon, and a rotary member having said contact member mounted thereon, the rotary member being secured to said visor so as to rotate therewith around an axis of said shaft portion of said stay.

7. In a door mirror for use in a motor vehicle which comprises a stay secured on an outer surface of a door and pivotably supports a mirror visor thereon with the stay having a shaft portion about which the visor rotates, the combination which comprises:

an electrical motor mounted on the visor a source of DC power for the motor;

power transmission means for transmitting the power developed by said motor to said stay to pivotally move said visor between a projected and retracted position with respect to said stay, the power transmission means including a first gear connected to said motor and a second gear secured on the shaft portion of the stay for engaging the first gear, whereby when the motor is driven, the first gear turns around said second gear and hence, around the shaft portion of said stay, control means connected between the power source and the motor for applying power to the motor with a selected polarity to cause the motor to move said visor to one of the retracted and projected positions from the other position, and a rotary switch mounted on the shaft portion of the stay and connected to the control means, the rotary switch being arranged to sense the pivotal movement of said visor and to be turned to one state when the visor has reached the retracted or projected position to thereby terminate the application of power to the motor and stop movement of the visor.

8. A door mirror as claimed in claim 7 wherein:

said rotary switch comprises a movable contact member, which is connected to the power source, a pair of contact segments which are arranged to move together with said visor, and a pair of contact arms, which operate in association with said movable contact member and the pair of contact segments, said control means comprises first and second switches which operate in association with each other respectively and have movable contact members connected to said motor, the first and second switches being manually operable, and including first and second terminals, the first terminal of the first and second switches being, respectively, connected to the power source, the second terminal of the first switch being connected to one of contact segments of said rotary switch, and the second terminal of the second switch being connected to the other of the contact segments of said rotary switch, said movable contact member being arranged to be alternatively held in contact with the corresponding first terminals.

* * * * *